(12) United States Patent
Krishnan et al.

(10) Patent No.: US 10,588,164 B2
(45) Date of Patent: *Mar. 10, 2020

(54) METHOD AND APPARATUS FOR A RADIO NODE AND A CONTROLLING GATEWAY

(71) Applicant: Telefonaktiebolaget LM Ericsson (publ), Stockholm (SE)

(72) Inventors: Suresh Krishnan, Johns Creek, GA (US); Stere Preda, Longueuil (CA); Catherine Truchan, Lorraine (CA)

(73) Assignee: TELEFONATIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/160,050

(22) Filed: Oct. 15, 2018

(65) Prior Publication Data

US 2019/0053298 A1 Feb. 14, 2019

Related U.S. Application Data

(63) Continuation of application No. 14/783,888, filed as application No. PCT/US2015/051226 on Sep. 21, 2015, now Pat. No. 10,129,914.

(51) Int. Cl.
*H04W 76/10* (2018.01)
*H04L 29/08* (2006.01)
(Continued)

(52) U.S. Cl.
CPC .............. *H04W 76/10* (2018.02); *H04L 29/08* (2013.01); *H04L 69/16* (2013.01); *H04W 92/12* (2013.01); *H04L 2212/00* (2013.01); *H04W 88/16* (2013.01)

(58) Field of Classification Search
CPC ..... H04W 76/10; H04W 92/12; H04W 88/16; H04L 69/16; H04L 29/08; H04L 2212/00
See application file for complete search history.

(56) References Cited

U.S. PATENT DOCUMENTS 6,668,175 B1 12/2003 Almgren et al.
8,917,698 B2 12/2014 Lundin et al.
(Continued)

FOREIGN PATENT DOCUMENTS

EP     1239686 A1   9/2002
WO 2010039085 A1   4/2010
(Continued)

OTHER PUBLICATIONS

3GPP, "3rd Generation Partnership Project; Technical Specification Group Core Network and Terminals; General Packet Radio System (GPRS) Tunnelling Protocol User Plane (GTPv1-U) (Release 12)", 3GPP TS 29.281 V12.1.0, Dec. 2014, pp. 1-27.
(Continued)

*Primary Examiner* — Walter J Divito
(74) *Attorney, Agent, or Firm* — Murphy, Bilak & Homiller, PLLC

(57) ABSTRACT

In one aspect of the teachings herein, a controlling gateway and an associated radio access point are configured for operation in a radio access network and use a radio protocol stack that is split on the network side between the gateway and the access point, for conveying radio bearer traffic going between the radio access network and a wireless device. According to methods and apparatuses disclosed, the radio protocol entities affected by the stack split communicate using Internet Protocol, IP, sessions. Advantageously, the radio bearer traffic conveyed over the split stack maps to different IP sessions in dependence on any one or more of network capabilities, various isolation or privacy requirements associated with the device and/or traffic, the types of data being conveyed, the types of radio bearers involved, and the involved Radio Link Control, RLC, operating modes.

10 Claims, 9 Drawing Sheets

(51) Int. Cl.
*H04W 92/12* (2009.01)
*H04L 29/06* (2006.01)
*H04W 88/16* (2009.01)

(56) References Cited

U.S. PATENT DOCUMENTS

2001/0043615 A1 11/2001 Park et al.
2008/0260389 A1 10/2008 Zheng et al.
2011/0176531 A1 7/2011 Rune et al.
2012/0233679 A1 9/2012 Shedrinsky et al.

FOREIGN PATENT DOCUMENTS

WO  2010128009 A1  11/2010
WO  2015060754 A1   4/2015

OTHER PUBLICATIONS

3GPP, "3rd Generation Partnership Project; Technical Specification Group Core Network and Terminals; Mobile radio Interface Layer 3 specification; Core network protocols; Stage 3 (Release 12)", 3GPP TS 24.008 V12.4.0, Dec. 2013, pp. 1-685.

3GPP, "3rd Generation Partnership Project; Technical Specification Group Radio Access Network; Evolved Universal Terrestrial Radio Access (E-UTRA); LTE physical layer; General description (Release 12)", 3GPP TS 36.201 V12.2.0, Mar. 2015, pp. 1-14.

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.6.0, Jun. 2015, pp. 1-77.

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.5.0, Mar. 2015, pp. 1-77.

3GPP, "3rd Generation Partnership Project; Technical Specification Group Radio Access Network; Evolved Universal Terrestrial Radio Access (E-UTRA); Packet Data Convergence Protocol (PDCP) specification (Release 10)", 3GPP TS 36.323 V10.2.0, Dec. 2012, pp. 1-26.

3GPP, "3rd Generation Partnership Project; Technical Specification Group Radio Access Network; Evolved Universal Terrestrial Radio Access (E-UTRA); Packet Data Convergence Protocol (PDCP) specification (Release 12)", 3GPP TS 36.323 V12.4.0, Jun. 2015, pp. 1-33.

3GPP, "3rd Generation Partnership Project; Technical Specification Group Radio Access Network; Evolved Universal Terrestrial Radio Access (E-UTRA); Packet Data Convergence Protocol (PDCP) specification (Release 12)", 3GPP TS 36.323 V12.3.0, Mar. 2015, pp. 1-33.

3GPP, "3rd Generation Partnership Project; Technical Specification Group Radio Access Network; Evolved Universal Terrestrial Radio Access (E-UTRA); Radio Link Control (RLC) protocol specification (Release 12)", 3GPP TS 36.322 V12.2.0, Mar. 2015, pp. 1-40.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0, Dec. 2013, pp. 1-344.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.6.0, Jun. 2015, pp. 1-449.

3GPP, "3rd Generation Partnership Project; Technical Specification Group Radio Access Network; Evolved Universal Terrestrial Radio Access Network (E-UTRAN); X2 interface user plane protocol (Release 12)", 3GPP TS 36.425 V12.0.0, Dec. 2014, pp. 1-15.

3GPP, "3rd Generation Partnership Project; Technical Specification Group Radio Access Network; UTRAN overall description (Release 11)", 3GPP TS 25.401 V11.1.0 (2012-120, Dec. 2012, pp. 1-63.

3GPP, "3rd Generation Partnership Project; Technical Specification Group Services and System Aspects; 3GPP System Architecture Evolution (SAE); Security architecture (Release 12)", 3GPP TS 33.401 V12.10.0, Dec. 2013, pp. 1-121.

Blaze, Matt, et al., "Divertible Protocols and Atomic Proxy Cryptography", In Proceedings of Eurocrpt '98, vol. 1403, Chapter 3, 1998, pp. 127-144.

Laraqui, Kim, et al., "Residential Local Break Out Title of Invention in a Communication System", PCT application No. PCT/SE2014/050540, filed Apr. 30, 2014.

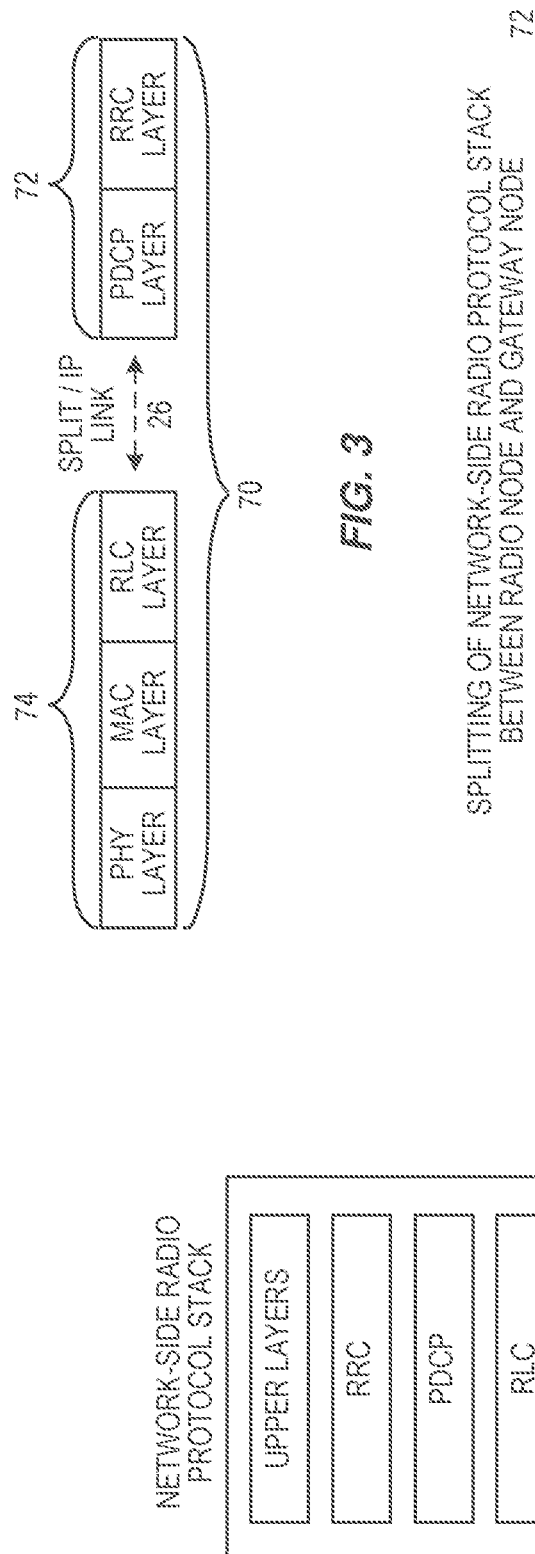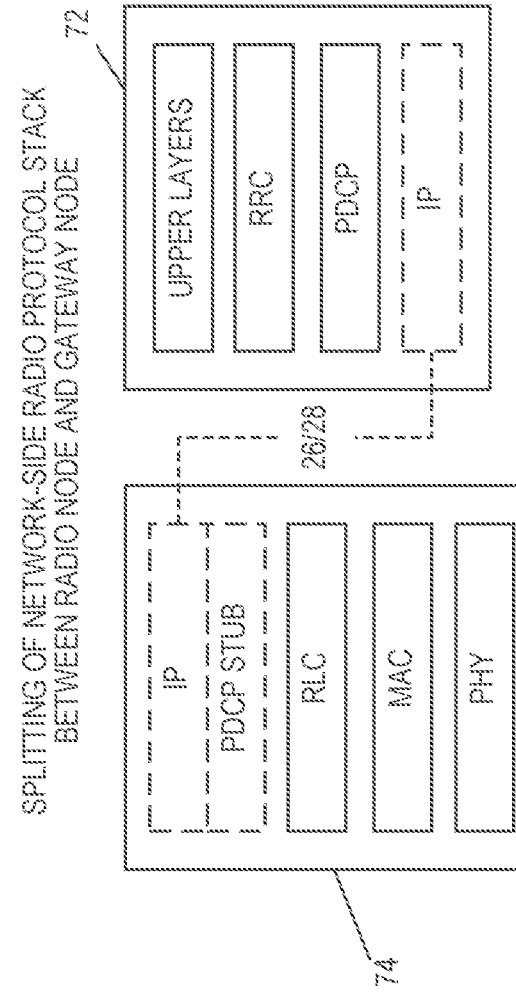

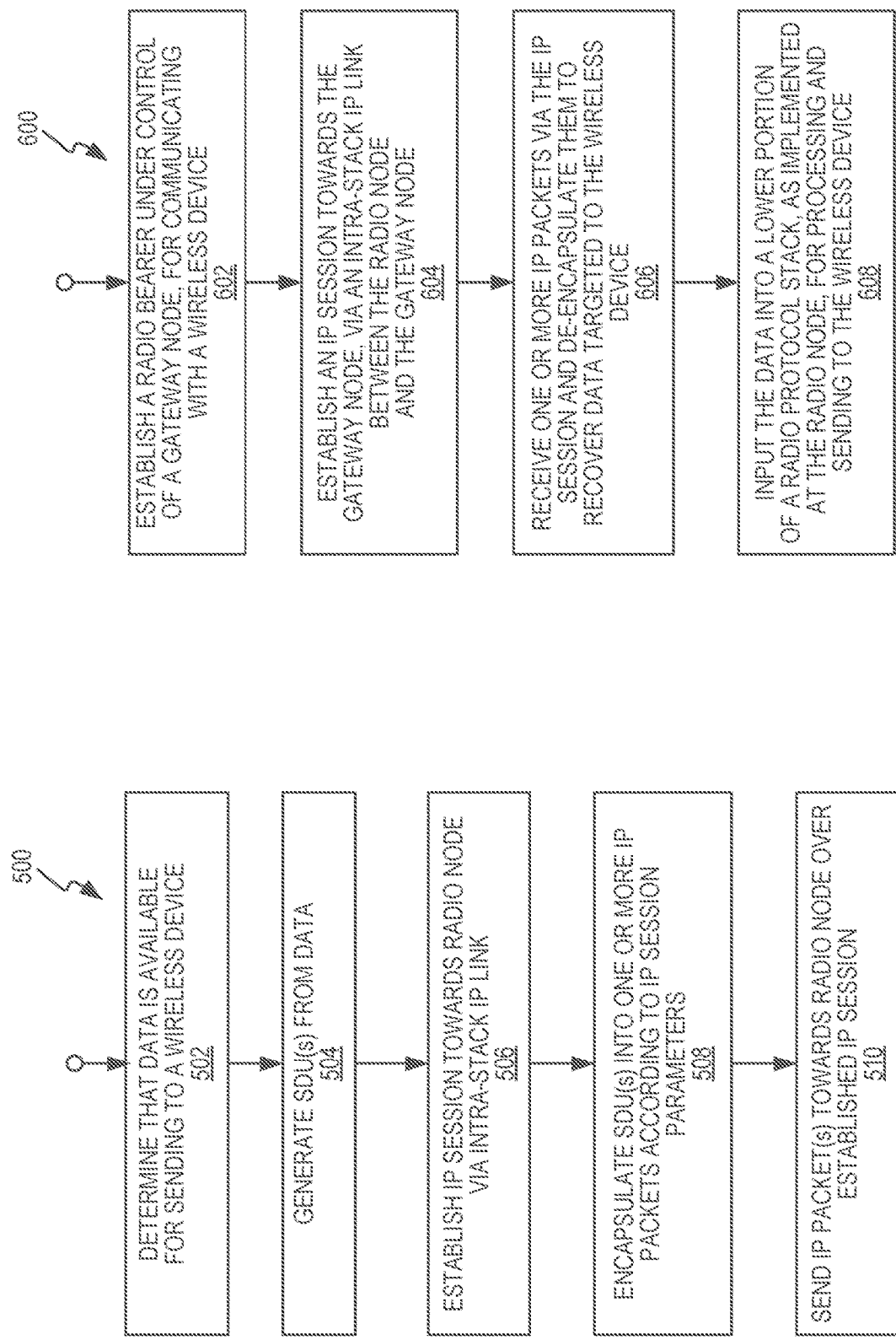

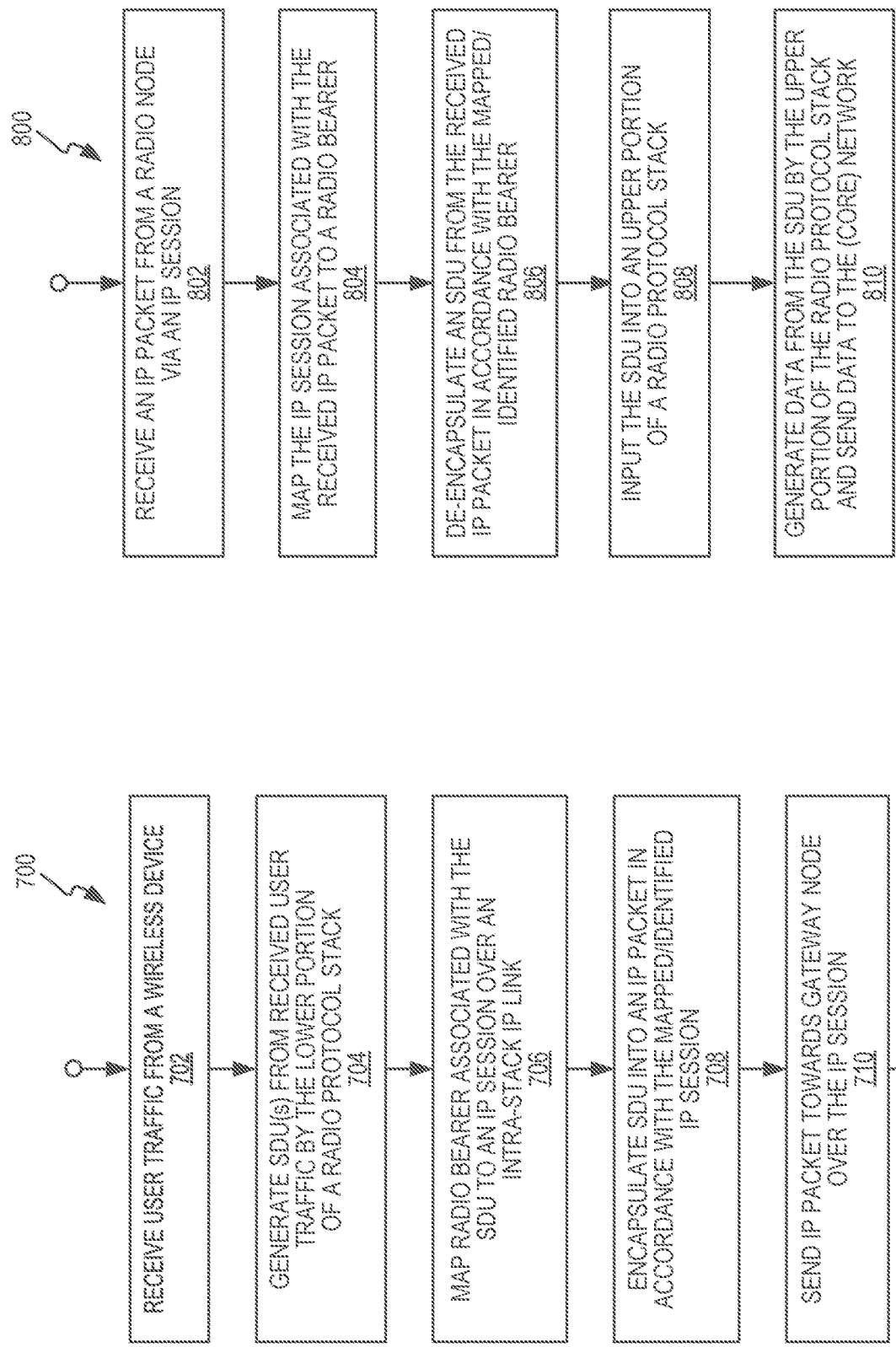

METHOD AND APPARATUS FOR A RADIO NODE AND A CONTROLLING GATEWAY

RELATED APPLICATIONS

This application is a continuation of U.S. application Ser. No. 14/783,888 filed 12 Oct. 2015, which is a U.S. National Phase Application of PCT/US2015/051226 filed 21 Sep. 2015. The entire contents of each aforementioned application is incorporated herein by reference.

TECHNICAL FIELD

The present invention relates to wireless communication networks, and particularly relates to a radio node and a gateway node operating according to a split radio protocol stack.

BACKGROUND

Increased network density and increased heterogeneity are among the key factors complicating the design and implementation of wireless communication networks. Network designers and operators must balance the necessity of having good coverage, at least in areas of high use, and having the right type of coverage, e.g., high-data rate coverage, against the enormous capital and operating expenditures needed to deploy and maintain the kind of equipment needed to ensure that those necessities are being met.

In one approach to increasing network density, rather than simply adding more "macro" or large-cell base stations, network operators are deploying smaller, low-power base stations, or allowing third-parties, such as individual homeowners or other subscribers, to deploy such base stations. These base stations characteristically provide radio coverage in much smaller areas, e.g., only within the confines of a typical residence or office. Consequently, these coverage areas are often referred to as "small" cells.

The base stations or access points, APs, that provide small-cell coverage may or may not use the same Radio Access Technology, RAT, in use in the macro-layer of the network, and varying degrees of integration are contemplated for APs with respect to the network at large. For example, the APs may or may not be part of overall coordinated interference reduction schemes that coordinate scheduling or other operational aspects of the network across and between cells.

Merely by way of example, a network operator may lease or sell small, low-power APs that individual subscribers install in their homes or workplaces. These APs may provide better baseline coverage, or they may act as higher data-rate hotspots and, as such, they may have broadband connections back to the operator's network. In a particular approach, the APs couple to the operator's network through a controlling gateway. In such implementations, the AP has an air interface for connecting to devices and has one or more network connections, often "wired" connections, back to the controlling gateway, which in turn has some type of "backhaul" connection to the operator's core network.

The gateway arrangement provides a number of advantages. For example, one gateway may support more than one AP. Consequently, at least some of the processing can be consolidated in the gateway. The centralization of certain Radio Access Network, RAN, processing functions is a topic of growing interest, and if is envisioned as a key aspect of future-generation network implementations.

Broadly, the idea here involves dividing the overall air interface operations and management processing between the actual radio access points providing the radio bearers and centralized processing nodes that provide relatively cheap pools of processing resources that can be leveraged for potentially large numbers of radio access points, also referred to generically as "base stations". The lower-level functions, such as radio resource allocations and dynamic user scheduling are performed at the radio access nodes, which provide the actual radio link(s), while at least some of the higher-layer processing is moved to a central location.

This kind of disaggregation of the overall air interface processing protocols generally involves some "splitting" of the radio protocol stack between a radio access point and the centralized processing node. To better appreciate the split stack approach, consider the radio protocol stack used in Long Term Evolution or LTE. A wireless communication device and a network base station configured for operation in accordance with the LTE air interface each implements a version of the LTE protocol stack.

Protocol entities in the device-side stack mirror and communicate with corresponding peer entities in the network-side stack. The LTE stack includes a physical or PHY layer, as its bottom-most layer, a Medium Access Control, MAC, layer above the physical layer, a Radio Link Control, RLC, layer above the MAC layer, a Packet Data Convergence Protocol, PDCP, layer above the RLC layer, and a Radio Resource Control, RRC, layer above the PDCP layer. For more details regarding these layers and their functions, the interested reader may refer to the following Third Generation Partnership Project, 3GPP, Technical Specifications: TS 36.201 for a discussion of the physical layer, TS 36.321 for a discussion of the MAC layer, TS 36.322 for a discussion of the RLC layer, TS 36.323 for a discussion of the PDCP layer, and TS 36.331 for a discussion of the RRC layer.

In the context of the aforementioned gateway arrangement, a residential or other such radio access point implements a portion of the radio protocol stack on the network side, with the remaining portion of the stack implemented at the controlling gateway. This arrangement provides the twofold benefit of simplifying the radio access point and leveraging the gateway node for supporting more than one radio access point. However, the protocol endpoints or peers for the network-side radio protocol stack exist in the device-side protocol stack, and there are no standardized endpoints or mechanisms for the split-stack interface between the radio access point and the controlling gateway.

It is recognized herein that the split should be transparent to the overall radio stack protocols and should be managed for link efficiencies and reliability. Further recognized herein are the dual needs for scalability and discoverability, e.g., so that individual connecting gateways can support tens, hundreds or even greater numbers of radio access points, and so that the involved inter-split connections can be easily configured between the involved controlling gateway and its supported radio access points.

SUMMARY

In one aspect of the teachings herein, a controlling gateway and an associated radio access point are configured for operation in a radio access network and use a radio protocol stack that is split on the network side between the gateway and the access point, for conveying radio bearer traffic between the radio access network and a wireless communication device. According to methods and apparatuses disclosed, the radio protocol entities affected by the stack split communicate using Internet Protocol, IP, sessions. Advantageously, the radio bearer traffic conveyed over the split stack maps to different IP sessions in dependence on any one or more of network capabilities, various isolation or privacy requirements associated with the wireless communication device and/or traffic, the types of data being conveyed, the types of radio bearers involved, and the involved Radio Link Control, RLC, operating modes.

In one embodiment, a method of operation in a gateway node that is coupled to a core network of a wireless communication network includes determining that data is available for sending to a wireless communication device—also referred to as a "wireless device" or simply "device"—that accesses the wireless communication network via a radio cell provided by a radio node that is coupled to a core network of the wireless communication network via the gateway node. The method includes generating service data units corresponding to the data, based on processing the data according to an upper portion of a radio protocol stack, where the radio protocol stack is split between the gateway node, which implements the upper portion of the radio protocol stack, and the radio node, which implements a remaining, lower portion of the radio protocol stack. Still further, the method includes establishing an IP session towards the radio node, via an intra-stack IP link communicatively coupling the upper portion of the radio protocol stack at the gateway node with the lower portion of the radio protocol stack at the radio node.

The IP session is mapped to a radio bearer to be used for conveying the data to the wireless device via an air interface of the radio cell, and the method further includes encapsulating the service data units in one or more IP packets, according to IP session parameters associated with the IP session, and sending the IP packets to the radio node via the IP session, for de-encapsulation and recovery of the service data units, for subsequent processing by the radio node according to the remaining, lower portion of the radio protocol stack. Complementary processing and configurations also apply in the uplink direction, where data transmitted by the wireless device is received at the radio node and processed according to the portion of the protocol stuck implemented at the radio node, and encapsulated for transfer across the intra-stack IP link. Note that the intra-stack IP link is transparent to the overall protocol flow going between the wireless network and the device. In other words, the intra-stack IP link merely provides a mechanism for conveying data between the protocol entities that would otherwise not be split if the radio protocol stack on the network side were consolidated in a single node.

In another embodiment, a gateway node is configured for operation in a wireless communication network and includes a first communication interface that is configured for communicating with a radio node to be controlled by the gateway node. The gateway node further includes a second communication interface that is configured for communicating with one or more core network nodes in a core network of the wireless communication network. Still further, the gateway node includes processing circuitry that is operatively associated with the first and second communication interfaces.

The processing circuitry is configured to determine that data is available for sending to a wireless device that accesses the wireless communication network via a radio cell provided the radio node, where the radio node is coupled to the core network of the wireless communication network via the gateway node. The processing circuitry is further configured to generate service data units corresponding to the data, based on processing the data according to an upper portion of a radio protocol stack, where the radio protocol stack is split between the gateway node, which implements the upper portion of the radio protocol stack, and the radio node, which implements a remaining, lower portion of the radio protocol stack. The processing circuitry is further configured to establish an IP session towards the radio node, via an intra-stack IP link communicatively coupling the upper portion of the radio protocol stack at the gateway node with the lower portion of the radio protocol stack at the radio node. The IP session is mapped to a radio bearer to be used for conveying the data to the wireless device via an air interface of the radio cell and the processing circuitry is additionally configured to encapsulate the service data units in one or more packets, according to IP session parameters associated with the IP session, and send the IP packets to the radio node via the IP session, for de-encapsulation and recovery of the service data units, for subsequent processing by the radio node according to the remaining, lower portion of the radio protocol stack. Complementary processing and configurations also apply in the uplink direction, where data transmitted by the wireless device is received at the radio node and processed according to the portion of the protocol stack implemented at the radio node, and encapsulated for transfer across the intra-stack IP link.

In yet another embodiment, a gateway node is configured for operation in a wireless communication network and includes a first communication interface that is configured for communicating with a radio node to be controlled by the gateway node, along with a second communication interface that is configured for communicating with one or more core network nodes in a core network of the wireless communication network. The gateway node further includes processing circuitry that is operatively associated with the first and second communication interfaces.

The processing circuitry is configured to receive an IP packet from the radio node in an IP session on an intra-stack IP link that communicatively couples a lower portion of a radio protocol stack at the radio node to an upper portion of the radio protocol stack at the gateway node. The radio protocol stack at issue here a network-side radio protocol stack complementing a device-side radio protocol stack implemented at the wireless device that sent the uplink data encapsulated in the received IP packet. The processing circuitry is further configured to map the IP session to a radio bearer, according to session-to-bearer mapping known at the gateway node, and to de-encapsulate a service data unit contained in the IP packet. The processing circuitry is configured to input the service data unit into the upper portion of the radio protocol stack and to send data generated from processing the service data unit according to the upper portion of the radio protocol stack to a network for higher-layer processing.

In a related embodiment method of operation in a gateway node includes receiving an IP packet front a radio node in an IP session on an intra-stack IP link that communicatively couples a lower portion of a radio protocol stack at the radio node to an upper portion of the radio protocol stack at the gateway node. Here, the radio node is controlled by the gateway node and provides a cell for wirelessly connecting wireless devices to the network. The radio protocol stack in question is a network-side radio protocol stack complementing a device-side radio protocol stack implemented at the wireless device that sent uplink data encapsulated in the IP packet.

The method further includes mapping the IP session to a radio bearer, according to session-to-bearer mapping known at the gateway node, de-encapsulating a service data unit contained in the IP packet, inputting the service data unit into the upper portion of the radio protocol stack, and sending the data generated from processing the service data unit according to the upper portion of the radio protocol stack to a core network for higher-layer processing.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a diagram of a known radio protocol stack, such as may be advantageously split according to the teachings herein.

FIG. 3 is a diagram of one embodiment of a split radio protocol stack as implemented in a split configuration, with an upper portion of the stack implemented in a gateway node and a lower portion of the stack implemented in a radio node controlled by the gateway node.

FIG. 4 is a diagram of further example details for the split radio protocol stack of FIG. 3.

FIG. 5 is a logic flow diagram of one embodiment of a method of processing at a gateway node controlling a radio node, wherein a network-side radio protocol stack is split between the gateway node and the radio node.

FIG. 6 is a logic flow diagram of one embodiment of a method of processing at a radio node controlled by a gateway node, wherein a network-side radio protocol stack is split between the gateway node and the radio node.

FIG. 7 is a logic flow diagram of another embodiment of a method of processing at a radio node controlled by a gateway node, wherein a network-side radio protocol stack is split between the gateway node and the radio node.

FIG. 8 is a logic flow diagram of another embodiment of a method of processing at a gateway node controlling a radio node, wherein a network-side radio protocol stack is split between the gateway node and the radio node.

DETAILED DESCRIPTION

Figure 1:
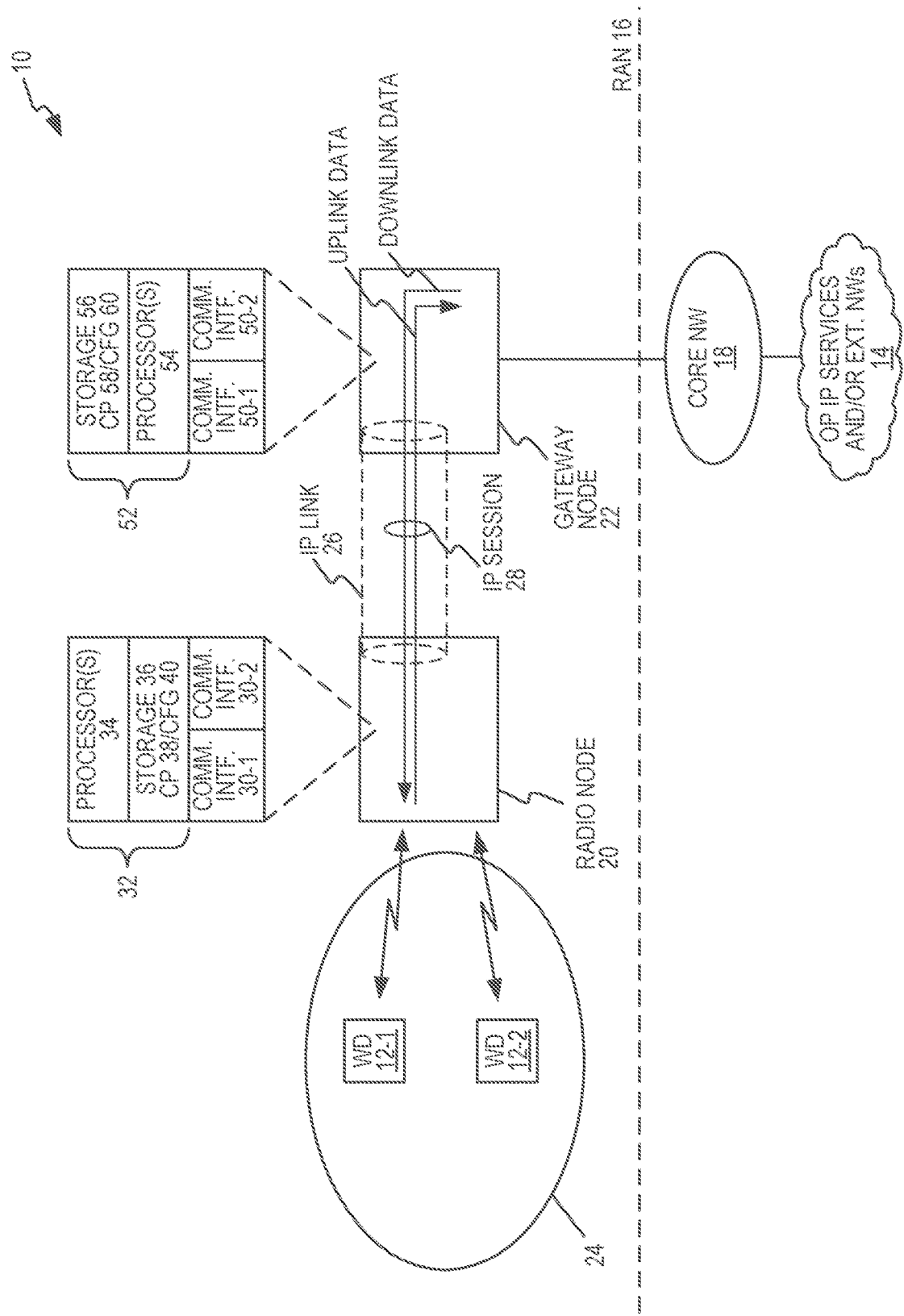
FIG. 1 is a block diagram of one embodiment of a gateway node and a radio node controlled by the gateway node, where both the gateway node and the radio node are configured for operation in a wireless communication network.

FIG. 1 illustrates a wireless communication network 10 configured to provide communication services to any number of wireless communication devices 12, where only two such devices 12-1 and 12-2 are shown by way of example. Unless suffixes are needed for clarity, the reference number "12" is used herein for both singular and plural reference to any given device, or devices. The same usage applies with respect to any other "base" reference number where suffixing is used herein.

The network 10 communicatively couples the individual devices 12 to one or more operator, OP, Internet Protocol, IP, services and/or external networks 14, such as the Internet and may provide for inter-device communications within the network 10. The network 10 includes a Radio Access Network, RAN 16, and a Core Network, CN 18. In this example, the RAN 16 includes a radio node 20 and a gateway node 22. The gateway node 22 is configured to control the radio node 20 and to provide communicative coupling to the CN 18. By way of example, the radio node 20 is a home base station or other small-cell device that provides radio coverage in a corresponding radio cell or cells 24, which may have a limited coverage area, such as a low-power cell intended to encompass a single residence or other structure.

While only one cell 24 is illustrated, it will be appreciated that the radio node 20 may provide more than one cell 24, e.g., by using different carrier frequencies, using different frequency sub-bands, using Time Division Multiplexing, TDM, etc. Although only one radio node 20 and one gateway node 22 are illustrated, the network 10 may include any number of radio nodes 20, e.g., each at different locations within a broader geographic area. Further, the network 10 may include a gateway node 22 for each such radio node 20, or may have one gateway node 22 for subsets or groups of radio nodes 20. In one or more embodiments, it is contemplated to control potentially large numbers of radio nodes 20 via one gateway node 22. Additionally, the network 10 may include other entities not illustrated or described, as will be understood by those of ordinary skill in the wireless communication arts. For example, in one or more non-limiting embodiments, the network 10 comprises a Long Term Evolution, LTE, or LTE-Advanced network, configuring according to the applicable technical specifications promulgated by the Third Generation Partnership Project, 3GPP. Consequently, the network 10 includes a variety of nodes or other entities associated with such networks, including Mobility Management Entities or MMEs in the CN 18, along with a Packet Data Gateway Nodes or PDGN, providing a packet data interface between the CN 18 and the external network(s) 14.

Regardless of whether the radio node 20 is implemented as a LTE Home eNB, HeNB, or as some other type radio base station, it will be understood as comprising a mix of signal processing and control circuitry, along with supporting radio transceiver circuitry. In the example illustration, the radio node 20 includes first and second communication interfaces 30-1 and 30-2—generally referred to as "communication interfaces 30"—along with processing circuitry 32 that is operatively associated with the communication interfaces 30.

The processing circuitry 32 comprises fixed circuitry, programmed circuitry, or a combination of fixed and programmed circuitry. In an example embodiment, the processing circuitry 32 is at least partly implemented using programmed circuitry and comprises, for example, one or more processors 34, such as one or more microprocessors. Digital Signal Processors or DSPs, Application Specific Integrated Circuits or ASICs, Field Programmable Gate Arrays or FPGAs, or other digital processing circuitry. Correspondingly, the processing circuitry 32 includes or is associated with one or more types of computer-readable media— "STORAGE 36" in the figure—such as one or more types of memory circuits such as FLASH, EEPROM, SRAM, DRAM, etc. Additionally, or alternatively, the storage 36 comprises hard disk storage, Solid State Disk, SSD, storage, etc.

In general, the storage 36 provides both working memory and longer-term storage. In at least one embodiment, the storage 36 provides non-transitory storage for a computer program 38 and one or more items of configuration data 40. Here, non-transitory does not necessarily mean permanent or unchanging storage but does means storage of at least some persistence—i.e., holding information for subsequent retrieval. The computer program 38, which may comprise a number of related or supporting programs, comprises program instructions that, when executed by the one or more processors 34 implement the processing circuitry 32 according to the configuration examples described herein. In other words, in some embodiments, one or more general-purpose processing circuits within the radio node 20 are specially adapted to carry out the teachings herein, based on their execution of the computer program instructions comprising the computer program 38.

However implemented, the radio node 20 is configured to provide radio coverage in one or more cells 24, and the first communication interface 30-1 is configured for communicating with wireless devices 12 operating in any of the one or more cells 24. For example, the communication interface 30-1 is configured for transmitting and receiving radiofrequency signals according to the air interface protocols and signal structure adopted for the air interface between the radio node 20 and the devices 12. To that end, the communication interface 30-1 includes one or more radiofrequency transmitters and receivers, and associated protocol processing circuitry that is adapted to support the uplink and downlink air interfaces implemented within the network 10.

The radio node 20 further includes a second communication interface 30-2 configured to communicatively couple the radio node 20 to its controlling gateway node 22, which in turn is coupled to the CN 18. The second communication interface 30-2 may comprise a wired or wireless interface, e.g., a LAN or microwave-based interface, and shall be understood as providing physical-layer circuitry adapted for sending and receiving signals over the involved transmission medium, along with corresponding circuitry for protocol processing, as needed for communicating with the gateway node 22.

Similarly, the gateway node 22 will be understood as comprising a mix of signal processing and control circuitry, along with supporting communication interfaces—i.e., communication interface circuits. In the example illustration, the gateway node 22 includes first and second communication interfaces 50-1 and 50-2—generally referred to as "communication interfaces 50"—along with processing circuitry 52 that is operatively associated with the communication interfaces 50.

The processing circuitry 52 comprises fixed circuitry, programmed circuitry, or a combination of fixed and programmed circuitry. In an example embodiment, the processing circuitry 52 is at least partly implemented using programmed circuitry and comprises, for example, one or more processors 54, such as one or more microprocessors, Digital Signal Processors or DSPs, Application Specific Integrated Circuits or ASICs, Field Programmable Gate Arrays or FPGAs, or other digital processing circuitry. Correspondingly, the processing circuitry 52 includes or is associated with one or more types of computer-readable media— "STORAGE 56" in the figure—such as one or more types of memory circuits such as FLASH, EEPROM, SRAM, DRAM, etc. Additionally, or alternatively, the storage 56 comprises hard disk storage, Solid State Disk, SSD, storage, etc.

In general, the storage 56 provides both working memory and longer-term storage. In at least one embodiment, the storage 56 provides non-transitory storage for a computer program 58 and one or more items of configuration data 60. As before, the term non-transitory does not necessarily mean permanent or unchanging storage, but does means storage of at least some persistence. The computer program 58, which may comprise a number of related or supporting programs, comprises program instructions that, when executed by the one or more processors 54 implement the processing circuitry 52 according to the configuration examples described herein. In other words, in some embodiments, one or more general-purpose processing circuits within the gateway node 22 are specially adapted to carry out the teachings herein, based on their execution of the computer program instructions comprising the computer program 58.

However implemented, the first communication interface 50-1 is configured for communicating with the radio node 20, which is controlled by the gateway node 22, and the second communication interface 50-2 is configured for communicating with one or more core network nodes—not individually depicted in FIG. 1—in the CN 18 of the network 10.

Now consider FIG. 2, which illustrates a known radio protocol stack used in LTE. It will be appreciated that a complementary or mirror copy of the illustrated stack is conventionally implemented in each of the involved protocol endpoints—e.g., in a wireless device and in its serving base station. In the context of these teachings, the "network side" radio protocol stack is split between the radio node 20 and its controlling gateway node 22.

FIG. 3 illustrates an example split-stack arrangement. In the diagram, a radio protocol stack 70 is split. The upper portion 72 of the radio protocol stack 70 resides in the gateway node 22 while a lower portion 74 of the radio protocol stack 70 resides in the radio node 22.

In this example, the upper portion 72 includes a Packet Data Convergence Protocol, PDCP, layer and a Radio Resource Control, RRC, layer. In the hierarchy of the overall radio protocol stack 70, the PDCP layer is "below" the RRC layer. The lower portion 74 of the radio protocol stack 70 includes a Radio Link Control, RLC, layer, a Medium Access Control, MAC, protocol layer below the RRC protocol layer, and a Physical PHY, protocol layer below the MAC protocol layer.

FIG. 4 provides further example details. For example, one sees that a "PDCP stub" may be implemented in the lower portion 74 of the radio protocol stack 70, to account for the fact that the illustrated split lies at the RLC-to-PDCP interface. The intra-stack IP link 26/IP session(S) 28 communicatively couple the RRC and PDCP layers at the gateway node 22 to the RLC protocol layer at the radio node 20. In particular, one or more IP sessions 28 are used to send SDUs from the RRC/PDCP layers RLC layer to the RLC layer over the intra-stack IP link 26 in the downlink direction and vice-versa in the uplink direction.

Turning back to FIG. 1, the processing circuitry 52 of the gateway node 22 is operatively associated with the first and second communication interfaces 50 and is configured to determine that data is available for sending to a wireless device 12 that accesses the network 10 via a radio cell 24 provided by the radio node 20, where the radio node 20 is coupled to the CN 18 of the network 10 via the gateway node 22. The processing circuitry 52 is further configured to generate service data units corresponding to the data, based on processing the data according to an upper portion 72 of a radio protocol slack 70. The radio protocol slack 70 is split between the gateway node 22, which implements the upper portion 72 of the radio protocol stack 70, and the radio node 20, which implements the lower portion 74 of the radio protocol stack 70.

Here, it shall be understood that the radio protocol stack 70 is the network-side stack and that the wireless device 12 implements a complementary device-side radio protocol stack having peer entities corresponding to the protocol entities seen in the network-side stack 70. Thus, what is at issue here is the split between portions of the network-side radio protocol stack 70 and the need for establishing a reliable, efficient, and scalable mechanism for intra-stack communications between the protocol entities within the network-side radio protocol stack 70 that are exposed to the split.

To that end, the processing circuitry 52 of the gateway node 22 is configured to establish an IP session 28 towards the radio node 20, via an intra-stack IP link 26 that communicatively couples the upper portion 72 of the radio protocol stack 70 at the gateway node 22 with the lower portion 74 of the radio protocol stack 70 at the radio node 20. Notably, this IP session is distinct from and transparent to any IP sessions that may be running at the "applications" layer between the wireless device 12 and an application server in the OP services/external networks 14. Indeed, according to the advantageous teachings herein, the IP session 28 is transparent to the end-to-end communications session(s) between the wireless device 12 and any end-point accesses via the network 10, and is used purely to connect the upper portion 72 of the network-side radio protocol stack 70 at the gateway node 22 to the lower portion 74 of the network-side radio protocol stack 70 at the radio node 20.

Advantageously, the IP session 28 is mapped to a radio bearer to be used for conveying the data to the wireless device 12 via an air interface of the radio cell 24, and the processing circuitry 52 is configured to encapsulate the service data units in one or more IP packets, according to IP session parameters associated with the IP session 28, and send the IP packets to the radio node 20 via the IP session 28, for de-encapsulation and recovery of the service data units, for subsequent processing by the radio node 20 according to the remaining, lower portion 74 of the radio protocol stack 70.

Complementary processing and functions at the gateway node 22 and at the radio node 20 provide for the transfer of uplink data and signaling from the wireless device over one or more IP sessions 2S on the intra-stack IP link 26. That is, downlink data towards the wireless device 12 is processed at the gateway node 22 according to the protocol layers implemented in the upper portion 72 of the radio protocol stack 70, and is encapsulated as IP traffic for conveyance over an IP session 28 supported via the intra-stack IP link 26. The radio node 20 receives the encapsulated data and de-encapsulates it for processing according to the protocol layers implemented in the lower portion 74 of the radio protocol stack 70. Conversely, uplink data—traffic or signaling—from the wireless device 12 is received by the radio node 20 and processed in the uplink direction according to the lower portion 74 of the radio protocol stack. The processed data is sent from the radio node 20 to the gateway node 22 as IP packets in an IP session 28 on the intra-stack IP link 26. The gateway node 22 extracts the data encapsulated in the IP packets and continues processing that data in the uplink direction, according to the protocol layers implemented in the upper portion 72 of the radio protocol stack 70.

In at least some embodiments, the processing circuitry 52 is configured to establish the IP session 28 using a User Datagram Protocol, UDP, when the radio bearer is a data radio bearer, and the wireless device 12 is operating in a Radio Link Control, RLC, Unacknowledged Mode, UM. The processing circuitry 52 is further configured to establish the IP session 28 using a Transmission Control Protocol, TCP, when the radio bearer is a data radio bearer and the wireless device 12 is operating in a RLC Acknowledged Mode, AM, or in a RLC Transparent Mode, TM. Still further, the processing circuitry 52 is configured to establish the IP session 28 using a Transport Layer Security, TLS, protocol, when the radio bearer is a signaling radio bearer, for transmitting Broadcast Control Channel, BCCH, or Paging Control Channel, PCCH, signaling. TLS is also used for SRB0 and SRB1, after AS. Further, in at least some embodiments, the IP session 28 is mapped uniquely for the radio bearer and the wireless device 12, or is mapped according to a unique flow label assigned to the radio bearer, or is mapped to a unique flow label assigned to the wireless device 12.

FIG. 5 illustrates a method 500 of operation in a gateway node 22 that is coupled to a CN 18 of a network 10. By way of example, FIG. 5 focuses on downlink processing and the method 500 includes determining (Block 502) that data is available for sending to a wireless device 12 that accesses the wireless communication network 10 via a radio cell 24 provided by a radio node 20 that is coupled to the CN 18 of the wireless communication network 10 via the gateway node 22. The method 500 further includes generating (Block 504) service data units corresponding to the data, based on processing the data according to an upper portion 72 of a radio protocol stack 70, wherein the radio protocol stack 70 is split between the gateway node 22, which implements the upper portion 72 of the radio protocol stack, and the radio node 20, which implements a remaining, lower portion 74 of the radio protocol stack 70.

Still further, the method 500 includes establishing (Block 506) an IP session 28 towards the radio node 20, via an intra-stack IP link 26 that communicatively couples the upper portion 72 of the radio protocol stack 70 at the gateway node 22 with the lower portion 74 of the radio protocol stack 70 at the radio node 20. The IP session 28 is mapped to a radio bearer to be used for conveying the data to the wireless device 12 via an air interface of the radio cell 24, and the method 500 includes encapsulating (Block 508) the service data units in one or more IP packets, according to IP session parameters associated with the IP session 28, and sending (Block 510) the IP packets to the radio node 20 via the IP session 28, for de-encapsulation and recovery of the service data units, for subsequent processing by the radio node 20 according to the remaining, lower portion 74 of the radio protocol stack 70.

The IP link 26 in one embodiment comprises an IP Version 6, IPv6, link. Of course, it is also contemplated that the IP link 26 be implemented as an IPv4 link and in operation, the gateway node 22 may support IP sessions 28 based on both IPv4 and IPv6. For example, a given radio node 20 may not support IPv6, while another radio node 20 does support IPv6.

FIG. 6 illustrates a method 600 in a radio node 20, corresponding to the gateway method 500. The radio node 20 is configured for operation in the network 10 and is particularly configured for being controlled by the gateway node 22. The method 600 includes establishing (Block 602) a radio bearer under control of a gateway node 22, for communicating with a wireless device 12 and establishing (Block 604) an IP session 28 with the gateway node 22, via an intra-stack IP link 26 between the radio node 20 and the controlling gateway node 22. Again, this IP link 26 is for connecting the upper and lower portions 72 and 74 of the split radio protocol stack 70, and should not be confused with end-to-end IP sessions/links between the wireless device 12 and any "application" layer servers or systems.

The method 600 further includes receiving (Block 606) one or more IP packets via the IP session 28 and de-encapsulating the received IP packets to recover the data targeted to the wireless device 12. More particularly, the de-encapsulation involves de-encapsulating the IP packets to recover the SDUs incoming from the protocol layer operating in the gateway node 22 at the point where the radio protocol stack 70 is split between the gateway node 22 and the radio node 20. Correspondingly, the method 600 further includes inputting (Block 608) the de-encapsulated data into the remaining, lower-portion 74 of the radio protocol stack 70, as implemented at the radio node 20, for processing and sending to the wireless device 12 over the air interface.

FIGS. 7 and 8 illustrate substantially similar processing as set forth in FIGS. 5 and 6, but are presented in the context of uplink processing. In particular, the method 700 of FIG. 7 depicts radio node processing and includes receiving (Block 702) user traffic from a wireless device 12. The method 700 further includes generating (Block 704) SDU(s) from the received user traffic, via the lower portion 74 of the radio protocol stack 70, and mapping (Block 706) the radio bearer associated with the SDU(s) to an IP session 28 on the intra-stack IP link 26. Processing continues with the radio node 20 encapsulating (Block 708) the SDU(s) into one or more IP packets, in accordance with the mapped/Identified IP session 28, and sending (Block 710) the IP packet(s) towards the gateway node 22 over the intra-stack IP link 26.

FIG. 8 illustrates a corresponding method 800 as carried out by the gateway node 22. The method 800 includes receiving (Block 802) an IP packet from the radio node 20 in an IP session 28 on the intra-stack link 26, and mapping (Block 804) the IP session 28 to a radio bearer, according to session/bearer mapping known at the gateway node 22, e.g., from connection setup/establishment processing. Processing continues with the gateway node 22 de-encapsulating (Block 806) the SDU(s) contained in the IP packet and inputting (Block 808) the SDU(s) into the upper portion 72 of the radio protocol stack. The method 800 continues with the gateway node 22 sending (Block 810) the data generated from processing the SDU(s) in the upper portion 72 of the radio protocol stack 70 on to the core network for higher-layer processing.

Consequently, it will be appreciated that a SDU output from the "top" of the lower portion 74 of the radio protocol stack 70 is encapsulated in an IP packet for transport over the intra-stack IP link 26, in the IP session 28 to which the involved radio bearer is mapped. At the gateway node 22, the SDU is extracted from the IP packet and passed into the "bottom" of the upper portion 72 of the radio protocol stack 70, for completion of the overall protocol processing associated with the radio protocol stack 70 in the uplink direction. The converse is true in the downlink direction, i.e., SDUs emerging from the bottom of the upper portion 72 of the radio protocol stack 70 are encapsulated as IP packets and transported in a mapped IP session 28 over the intra-stack IP link 26. The radio node 20 de-encapsulates those IP packets to recover the SDUs, which are then input to the top of the lower portion 74 of the radio protocol stack 70, for completion of the overall stack processing in the downlink direction. It will be appreciated that the "bottom" of the upper portion 22 is taken as the stack layer at the gateway node 22 that is exposed to the split. Likewise, the "top" of the lower portion 74 is taken as the stack layer at the radio node 20 that is exposed to the split.

Figure 9:
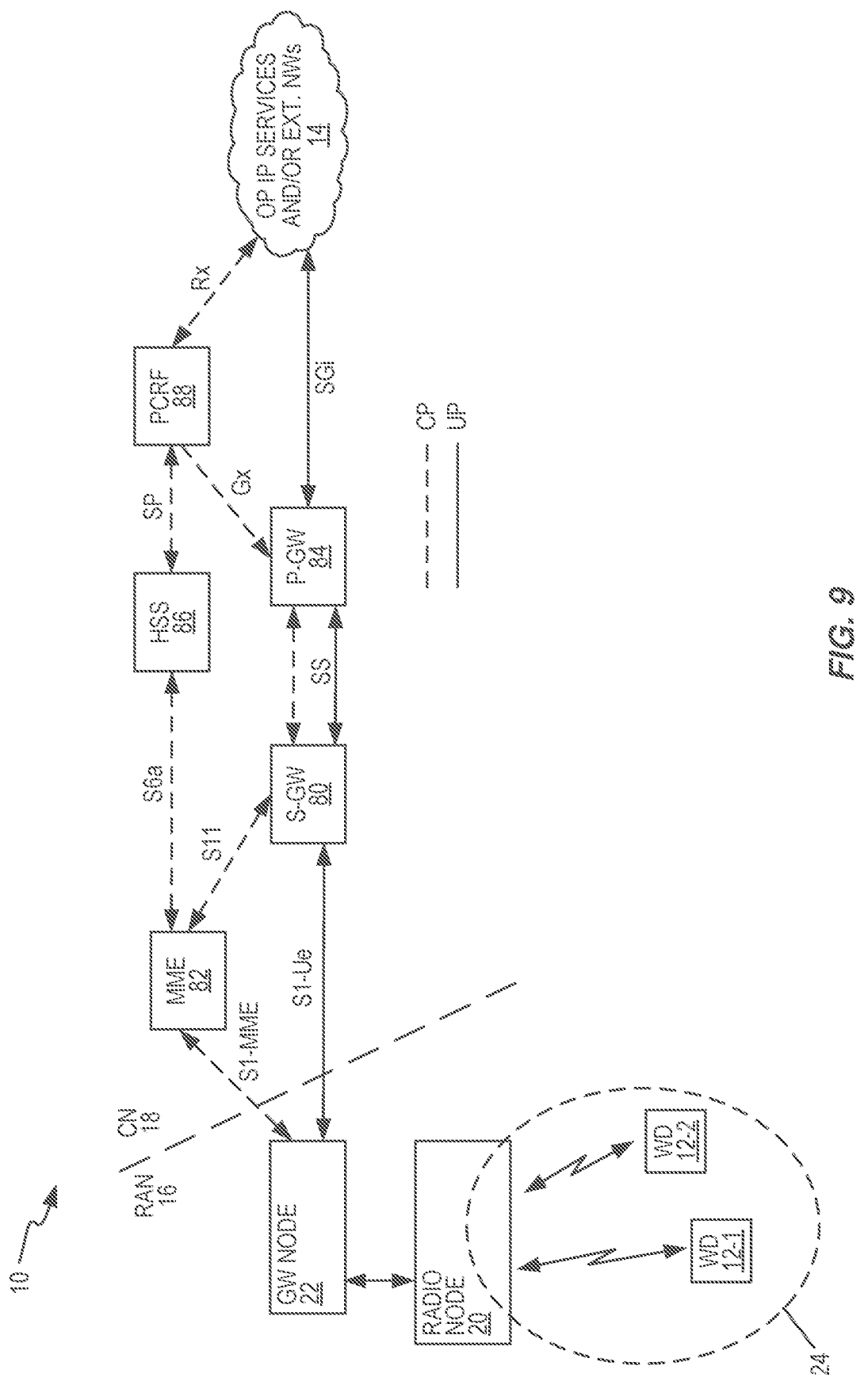
FIG. 9 is a block diagram of one embodiment of a gateway node and a radio node controlled by the gateway node, where both the gateway node and the radio node are configured for operation in a Long Term Evolution, LTE, network.

FIG. 9 illustrates an example embodiment in the context of a LTE network, wherein CN 18 includes serving gateway, S-GW 80, coupled to the gateway node 22 via a S1-UE interface, and a MME 82 coupled to the gateway node 22 via a S1-MME interface. The S-GW 80 and MME are communicatively coupled via a S11 interface, and the S-GW 80 is further communicatively coupled to a Packet Gateway, P-GW 84, which provides the packet-routing interface, SGi, into and out of the network 10. The MME 82 communicatively couples to a Home Subscriber Server, HSS 86, via an S6a interface, and the HSS 86 couples to a Policy and Charging Rules Function, PCRF 88, which is also coupled to the P-GW 84. In the diagram, dashed connection lines are used to illustrate Control Plane, CP, signaling, while solid connection lines are used to illustrate User Plane, UP, signaling.

Figure 10:
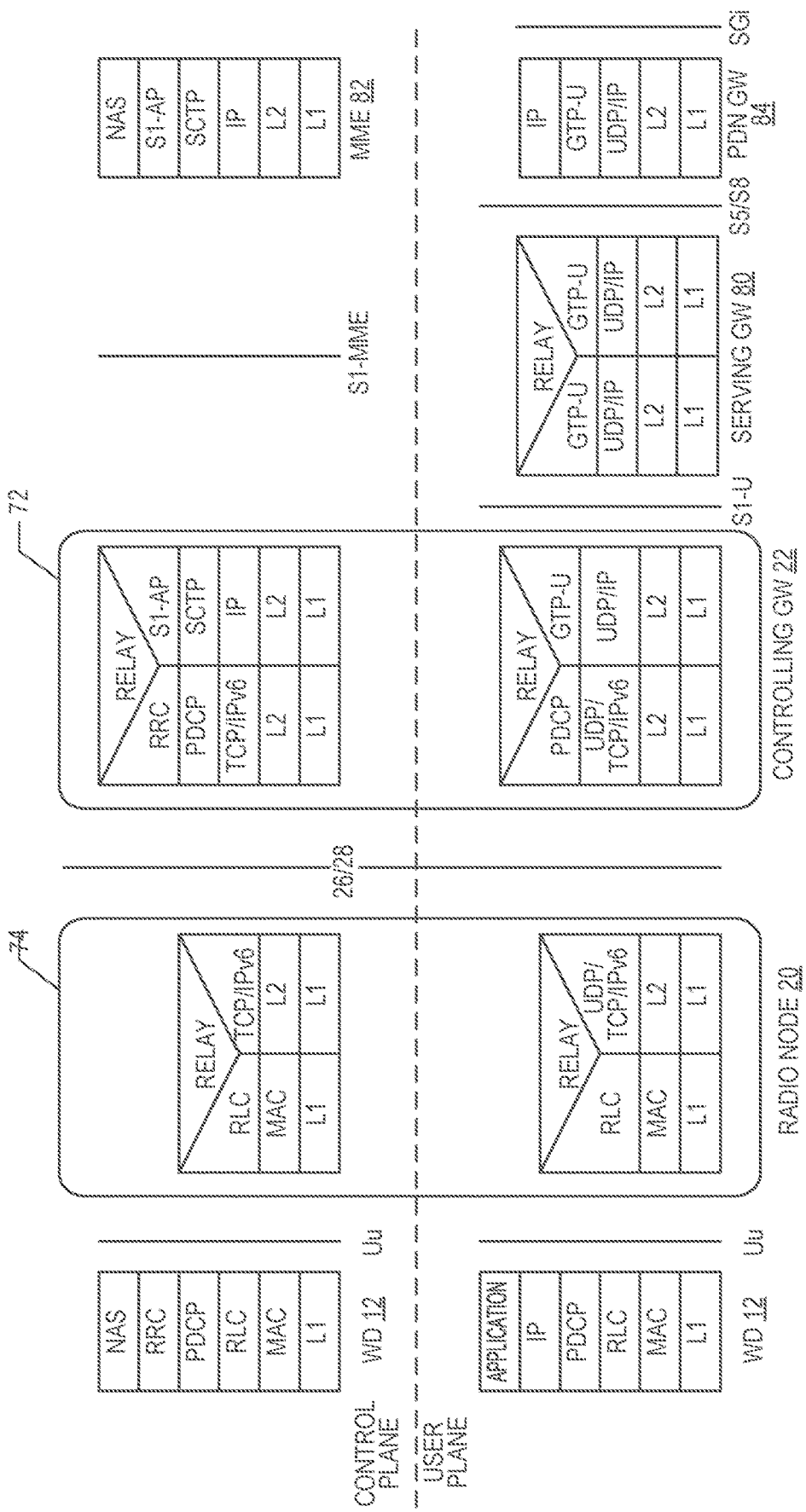
FIG. 10 is a diagram of the split radio protocol stack, shown in context with the additional supporting nodes seen in FIG. 9.

FIG. 10 illustrates an example splitting of the radio protocol stack 70 between the radio node 20 and the gateway node 22, in the context of the LTE network example of FIG. 9, FIG. 10 illustrates the further supporting protocol stacks used at the various other CN nodes seen in FIG. 9 and particularly highlights the IP link 26/IP session 28 used to link the lower portion 74 of the split radio protocol stack 70, as implemented in the radio node 20, with the upper portion 72 of the stack 70, as implemented in the gateway node 22. It will be appreciated that there may be any number of split-stack "instances" implemented between the gateway node 22 and the radio node 20, e.g., for simultaneously supporting multiple wireless devices 12.

With the above example implementation details in mind, it shall be appreciated that the mapping of radio bearer, RB, traffic, e.g., PDCP PDUs, to IP sessions 28 provides for flexible connectivity between a gateway node 22 and any number of controlled radio nodes 20. The proposed RB-to-IP mapping schemes provide a scalable solution that supports potentially large numbers of radio nodes 20 with respect to a controlling gateway node 22.

Further, the mapping scheme(s) presented herein provide radio bearer traffic granularity and a sound, robust traffic isolation solution upon which various network use-cases become more easily deployable by the network operator. Example use cases include bearer-based or device-based routing policy deployment, for efficiently routing device traffic over the IP connection interconnecting the split stack 70, e.g., using IPv6 flow labels. Another example is bearer-based and/or device-based access control security policy deployment, such as where firewalling parameters or policy settings are based on the identities of the wireless devices 12 being supported via the split-stack arrangement. Further examples include bearer-based and/or device-based Quality-of-Server, QoS, policy deployment, data packet inspection at the gateway node 22 on a per device 12 and a per radio node 20 basis, and lawful interception techniques, which typically requires per device discrimination.

The teachings herein further provide for the use of IP service discovery for dynamic configuration of the radio node 20, e.g. IPv6 address auto-configuration—stateless address auto configuration or SLAAC—as well as dynamic discovery of the gateway node 22 by each radio node 20 to be controlled by the gateway node 22. The teachings herein further provide for the use of Transport Layer Security, TLS, encryption to secure BCCH, PCCH, SRB0 and SRB1 traffic, which is not PDCP-ciphered. Here, "SRB0" and "SRB1" denotes Signaling Radio Bearer 0 and Signaling Radio Bearer 1, respectively. The SRB0 and SRB1 are used for the transfer of RRC and Non-Access Stratum signaling messages, RRC messages go between the wireless device 12 and the radio node 20 and NAS messages go between the wireless device 12 and the MME 82. Still further, the teachings herein enable the use of TCP for window-based flow control of RLC traffic in the AM mode.

In an example implementation, the radio node 20 provides the RLC/MAC/PHY layers of radio protocol stack 70, i.e., the lower portion 74 of the split stack 70 at the radio node 20 includes the RLC, MAC, and PHY layers. Correspondingly, the gateway node 22 provides centralized RRC and PDCP functions, which are managed by the involved network operator and are connected to any number of radio nodes 20. Thus, the gateway node 22 provides centralized radio resource control for multiple radio nodes 20. The gateway node 22 further provides the mapping between the GTP-U TEID-to-IP sessions for Data Radio Bearers, DRBs, as well as the mapping of RRC contexts-to-IP sessions for Signaling Radio Bearers, SRBs, based on the information supplied by each such radio node 20.

In the LTE context and with reference again to FIG. 10, the Uu and S1 interfaces are unchanged in one or more embodiments contemplated herein. The changes are limited to the newly proposed interface between the gateway node 22 and the radio node 20, for communicatively coupling together the upper portion 72 of the split radio protocol stack 70 with the lower portion 74 the split radio protocol stack 70. This new interface, represented in FIG. 10 as the IP link 26/IP session(s) 28, transports packets between the protocol entities that are exposed to the split. In LTE, the CP and UP traffic carried over this new interface, where RRC messages may be simply forwarded on a "pass-through" basis from RLC entities to PDCP entities and vice versa. BCCH, PCCH, SRB0 and SRB1 traffic are sent over the IP link 26 using TLS/TCP/IP, SRB2 and DRBs are PDCP protected, i.e. encrypted, and, therefore, are sent over the IP link 26 using TCP or UDP. In one or more embodiments, Stream Control Transmission Protocol, SCTP, packets are avoided to prevent blocking issues that might otherwise arise with respect to CPE firewalling.

Figures 11, 12:
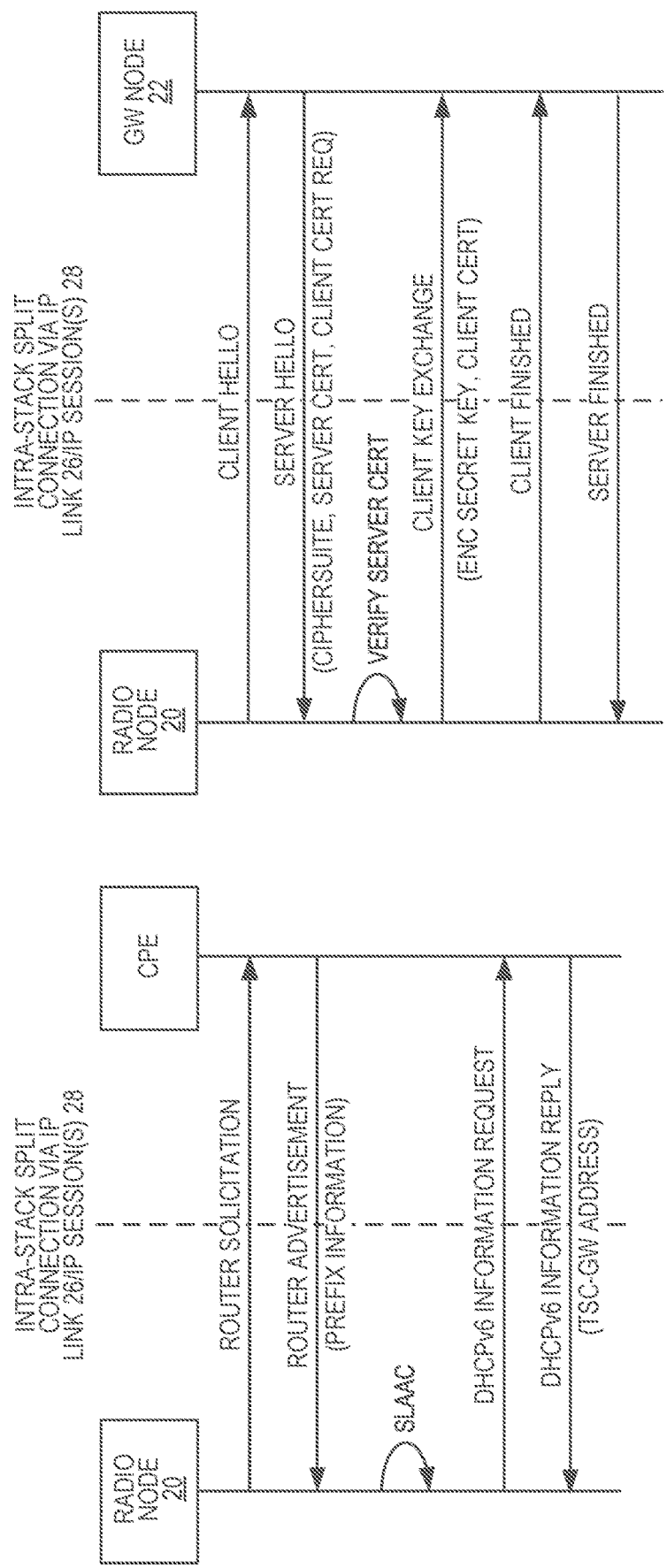
FIG. 11 is a call flow diagram illustrating one embodiment of signaling between a radio node and customer premises equipment, CPE, used to couple the radio node to a controlling gateway node.
FIG. 12, is a call flow diagram illustrating one embodiment of signaling between a radio node and a controlling gateway node, for establishing a secure connection between them.

FIG. 11 illustrates an example call flow diagram covering local network attachment operations, wherein the radio node 20 connects to the local network provided by CPE. The radio node 20 sends router solicitation signaling and receives a return router advertisement, performs SLAAC processing, and then sends a DHCPv6 information request. The radio node 20 receives a corresponding response from the CPE that includes the address of the gateway node 22 supporting the radio node 20 and coupling it to the CN 18. Note that the router advertisement will contain a prefix to auto-configure an address, e.g., using SLAAC, and will have the Obit set to initiate stateless DHCPv6. It is also contemplated to use a Fully Qualified Domain Name, FQDN, if load balancing and/or failover of the gateway node 22 are required.

FIG. 12 illustrates a call flow diagram covering a secure channel establishment between a radio node 20 and its supporting gateway node 22. It is contemplated that in at least one embodiment of such signaling that a client certificate is used to authenticate the radio node 20 towards the network 10. A TLS connection may be used for sending unencrypted control and data plane traffic over the IP link 26/IP session 28.

Figure 13:
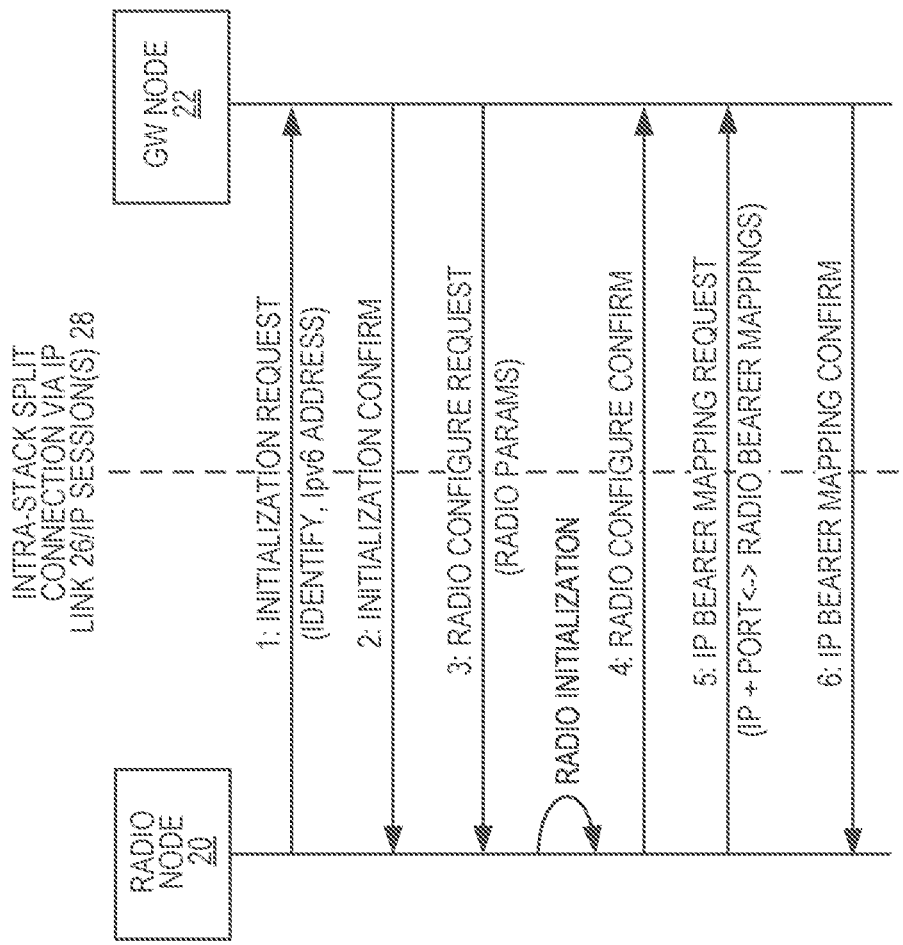
FIG. 13 is a call flow diagram illustrating one embodiment of signaling between a radio and a controlling gateway node, for configuring the radio node and setting up an IP session between the controlling gateway node and the radio node, for coupling the radio protocol stack split between the gateway and radio nodes.

FIG. 13 illustrates a call flow diagram covering processing that follows the establishment of a secure connection between a radio node 20 and its supporting gateway node 22. After establishing a secure channel, the radio node 20 connects to the gateway node 22 to initiate configuration. The gateway node 22 will then provide the radio initialization parameters, such as radio frequency bands, bandwidth, access schemes, antenna technology, physical channel configurations, etc., for the radio node 20. After receiving the radio parameters, the radio node 20 sends the set of mappings between each radio bearer and the IP address plus the port and/or IPv6 flow label combination that it will use for traffic on that specific bearer, with respect to the IP link 26.

Although it may be assumed that IPv6 links are used to transport data between the radio node 20 and the gateway node 22 for the IP link 26 supporting the stack spilt, the first mapping scheme presented below is also applicable to IPv4 links. It is assumed that there is a single PDU per IP packet, and all messages are sent in network byte order. All contemplated schemes consider UDP for bearers configured in RLC UM mode and TCP for RLC AM and TM.

In a first mapping option contemplated herein, there is a unique IP session 28 per bearer and per wireless device 12. That is, there is an IP session 28 on the IP link 26 for each bearer with respect to each wireless device 12 being supported by the radio node 20.

In a second mapping option contemplated herein, there is a unique IPv6 flow label per bearer type. As compared to the first mapping scheme, the difference is that flow isolation is achieved by using a different IPv6 flow label per radio bearer type. This second scheme allows for improved packet switching based on flow label or bearer type.

In a third mapping option, there is a unique IPv6 flow label per wireless device 12. As compared to the second mapping scheme, the difference with this third mapping scheme is that flow isolation is achieved by using a different flow label per wireless device 12, which is identified with a C-RNTI-like ID. If the flow labels are exchanged on demand, for example, upon initial attachment of a wireless device 12 to the radio node 20, the IPv6 flow labels could embed the C-RNTI of the attaching wireless device 12.

Figure 14:
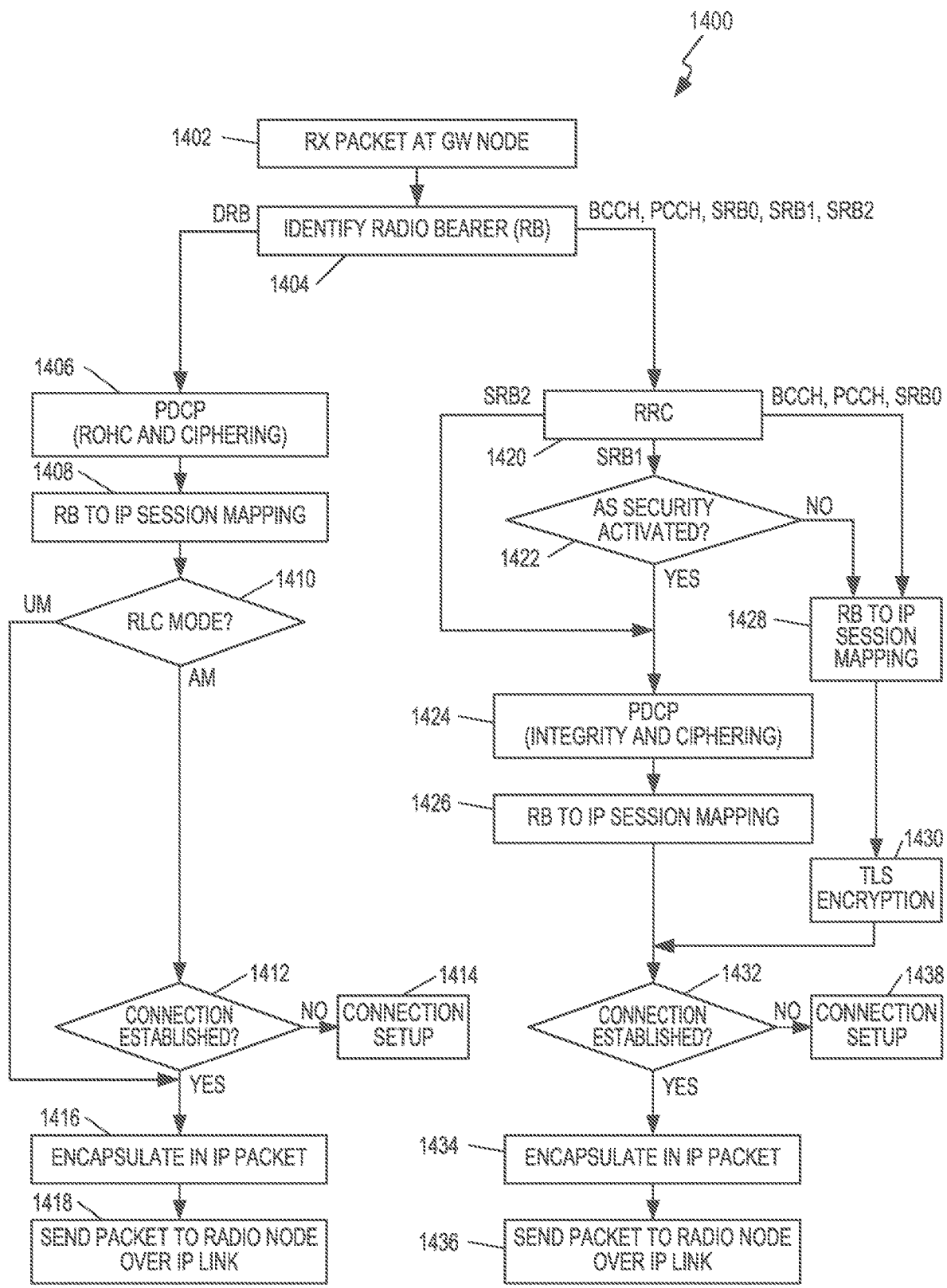
FIG. 14 is a logic flow diagram illustrating one embodiment of downlink packet processing involving a wireless device, a radio node and a controlling gateway node, where the radio node and the controlling gateway node use a split radio protocol stack.

FIG. 14 is a logic flow diagram illustrating another embodiment of a method 1400 of processing at a gateway node 22 that is configured for operation in a network 10, and for controlling a radio node 20 that is configured to communicatively couple one or more wireless devices 12 to the network 10 via a cell 24 provided by the radio node 20. The method 1400 focuses on a downlink example and begins with receiving a packet at the gateway node 22 for a given wireless device 12 (Block 1402). Processing continues with identifying the radio bearer or radio bearer type to be used for conveying the received packet (Block 1404). If the received packet is user traffic, it is associated with a DRB and processing continues in Block 1406, with performing Robust Header Compression, ROHC, and ciphering at the PDCP layer of the radio protocol stack 70. Here, the PDCP resides in the gateway node 22.

The involved DRB is mapped to an IP session 28 (Block 1408) that provides the intra-stack connection between the split entities of radio protocol stack 70, and the RLC mode is determined (Block 1410). For AM mode operation, the method 1400 includes checking whether a connection to the wireless device 12 has been established (Block 1412) and performing connection setup (Block 1414) if not. Once the connection has been setup, or if the RLC mode is UM, processing continues with encapsulating (Block 1416) the received user-traffic packet in an IP packet for conveyance (Block 1418) to the radio node 20 via the IP session 28 supported by the IP link 26 that interconnects the lower portion 74 of the split radio protocol stack 70 in the radio node 20 with the upper portion 72 of the split radio protocol stack 70 in the gateway node 22.

That is, the encapsulation occurs here for purposes of conveying the packet between the split entities of the radio protocol stack 70, as split between the gateway node 22 and the radio node 20, and is unrelated to any IP running at protocol layers above the split radio protocol stack 70. It will also be appreciated that a corresponding de-encapsulation, therefore, occurs within the lower portion 74 of the radio protocol stack 70 at the radio node 20. Thus, this usage of IP conveyance is transparent to higher-layer protocol endpoints running the wireless device 12 and, e.g., at the P-GW 84 or at some server external to the network 10, and is operative only with respect to interconnecting the entities within the radio protocol stack 70 that exposed to the split between the radio node 20 and the gateway node 22.

On the other hand, with reference again to Block 1404, if the received packet is BCCH, PCCH, or otherwise associated with SRB0, SRB1 or SRB2 control signaling, RRC processing is performed at Block 1420 and, for SRB1 signaling, processing includes determining whether AS Security—a LTE security protocol associated with RRC signaling—is active (Block 1422). If AS Security is not active, it is contemplated herein to advantageously apply TLS, and processing in this case thus continues with RB-to-IP-Session mapping (Block 1428), for the IP link 26, and TLS encryption of the received packet (Block 1430). TLS could be used for the duration of the SRB1 traffic, but switching after AS is another option. For SRB2 signaling, or in the case where AS Security is active, the PDCP layer processing includes encryption of the packet, and thus processing can continue from Block 1420 or Block 1422 with PDCP processing (Block 1424) and RB-to-IP-Session mapping for the IP link 26 (Block 1426).

From Block 1426, processing continues with determining whether a connection to the wireless device 12 has been established (Block 1432) and, if so, performing IP encapsulation of the packet for conveyance over the IP link 26 in the mapped IP session 28 (Blocks 1434 and 1436). If the connection has not already been setup, the connection is setup at Block 1438 (NO from Block 1432), and then the encapsulation and conveyance operations in Blocks 1434 and 1436 are carried out.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation in a gateway node that is coupled to a core network of a wireless communication network, the method comprising:
    implementing an upper portion of a radio protocol stack in the gateway node, the radio protocol stack being used to support communications with a wireless device having a corresponding radio protocol stack, wherein a lower, remaining portion of the radio protocol stack is implemented in a radio node that provides radio bearers for communicating with the wireless device; and
    exchanging Service Data Units (SDUs) between the upper portion of the radio protocol stack, as implemented in the gateway node, and the lower portion of the radio protocol stack, as implemented in the radio node, via an intra-stack IP link.

2. The method of claim 1, wherein the intra-stack IP link comprises an IP Version 6 (IPv6) link.

3. The method of claim 1, further comprising:
    for delivering data to the wireless device via a data radio bearer between the radio node and the wireless device when the wireless device is operating in a Radio Link Control (RLC) Unacknowledged Mode (UM), establishing an IP session over the intra-stack IP link using a User Datagram Protocol (UDP);
    for delivering data to the wireless device via a data radio bearer between the radio node and the wireless device when the wireless device is operating in a RLC Acknowledged Mode (AM) or in a RLC Transparent Mode (TM), establishing an IP session over the intra-stack IP link using a Transport Control Protocol (TCP); and
    for transmitting Broadcast Control Channel (BCCH) or Paging Control Channel (PCCH) signaling for the wireless device via a signaling radio bearer at the radio node, establishing an IP session over the inter-stack IP link using a Transport Security Layer (TLS) protocol.

4. The method of claim 1, wherein the radio protocol stack includes, in descending layer order, a Radio Resource Control (RRC) layer, a Packet Data Convergence Protocol (PDCP) layer, a Radio Link Control (RLC) protocol layer, a Medium Access Control (MAC) protocol layer, and a Physical (PHY) protocol layer, wherein the radio protocol stack is split at the RLC and PDCP layers, and wherein the intra-stack IP link communicatively couples the RLC layer in the radio node to the PDCP layer in the gateway node.

5. The method of claim 1, wherein the SDUs exchanged via the intra-stack link are exchanged in one or more IP sessions that are uniquely mapped for the wireless device.

6. A gateway node configured for operation in a wireless communication network and comprising:
    a first communication interface configured for communicating with a radio node to be controlled by the gateway node;
    a second communication interface configured for communicating with one or more core network modes in a core network of the wireless communication network; and
    processing circuitry operatively associated with the first and second communication interfaces and configured to:

implement an upper portion of a radio protocol stack in the gateway node, the radio protocol stack being used to support communications with a wireless device having a corresponding radio protocol stack, wherein a lower, remaining portion of the radio protocol stack is implemented in a radio node that provides radio bearers for communicating with the wireless device; and exchange Service Data Units (SDUs) between the upper portion of the radio protocol stack, as implemented the gateway node, and the lower portion of the radio protocol stack, as implemented in the radio node, via an intra-stack IP link.

7. The gateway of claim 6, wherein the intra-stack IP link comprises an IP Version 6 (IPv6) link.

8. The gateway node of claim 6, wherein the processing circuitry is configured to:

for delivering data to the wireless device via a data radio bearer between the radio node and the wireless device when the wireless device is operating in a Radio Link Control (RLC) Unacknowledged Mode (UM), establish an IP session over the intra-stack IP link using a User Datagram Protocol (UDP);

for delivering data to the wireless device via a data radio bearer between the radio node and the wireless device when the wireless device is operating in a RLC Acknowledged Mode (AM) or in a RLC Transparent Mode (TM), establish an IP session over the intra-stack IP link using a Transport Control Protocol (TCP); and for transmitting Broadcast Control Channel (BCCH) or Paging Control Channel (PCCH) signaling for the wireless device via a signaling radio bearer at the radio node, establish an IP session over the inter-stack IP link using a Transport Security Layer (TLS) protocol.

9. The gateway node of claim 6, wherein the radio protocol stack includes, in descending layer order, a Radio Resource Control (RRC) layer, a Packet Data Convergence Protocol (PDCP) layer, a Radio Link Control (RLC) protocol layer, a Medium Access Control (MAC) protocol layer, and a Physical (PHY) protocol layer, wherein the radio protocol stack is split at the RLC and PDCP layers, and wherein the intra-stack IP link communicatively couples the RLC layer in the radio node to the PDCP layer in the gateway node.

10. The gateway node of claim 6, wherein the SDUs exchanged via the intra-stack IP link are exchanged in one or more IP sessions that are uniquely mapped for the wireless device.

* * * * *

UNITED STATES PATENT AND TRADEMARK OFFICE
CERTIFICATE OF CORRECTION

PATENT NO. : 10,588,164 B2
APPLICATION NO. : 16/160050
DATED : March 10, 2020
INVENTOR(S) : Krishnan et al.

It is certified that error appears in the above-identified patent and that said Letters Patent is hereby corrected as shown below:

On the Title Page

In Item (73), under "ASSIGNEE", in Column 1, Lines 1-2, delete "TELEFONATIEBOLAGET LM ERICSSON (PUBL)" and insert -- TELEFONAKTIEBOLAGET LM ERICSSON (PUBL) --, therefor.

In the Specification

In Column 1, Line 7, delete "2015," and insert -- 2015, now U.S. Pat. No. 10,129,914, --, therefor.

In Column 1, Line 66, delete "if" and insert -- it --, therefor.

In Column 3, Line 42, delete "stuck" and insert -- stack --, therefor.

In Column 3, Line 65, delete "provided" and insert -- provided by --, therefor.

In Column 4, Line 17, delete "packets," and insert -- IP packets, --, therefor.

In Column 4, Line 54, delete "network" and insert -- core network --, therefor.

In Column 4, Line 56, delete "embodiment" and insert -- embodiment, --, therefor.

In Column 4, Line 57, delete "front" and insert -- from --, therefor.

In Column 5, Line 61, delete "12," and insert -- 12 --, therefor.

In Column 5, Line 66, delete "radio" and insert -- radio node --, therefor.

In Column 6, Line 17, delete "herein" and insert -- herein, --, therefor.

Signed and Sealed this
Eleventh Day of August, 2020

Andrei Iancu
*Director of the United States Patent and Trademark Office*

CERTIFICATE OF CORRECTION (continued)

In Column 6, Line 63, delete "type" and insert -- type of --, therefor.

In Column 7, Line 10, delete "microprocessors." and insert -- microprocessors, --, therefor.

In Column 8, Line 62, delete "RRC" and insert -- RLC --, therefor.

In Column 8, Line 63, delete "physical" and insert -- physical, --, therefor.

In Column 9, Line 1, delete "RLC-to-PDCP" and insert -- RLC-to-PDCP logical --, therefor.

In Column 9, Line 2, delete "session(S)" and insert -- session(s) --, therefor.

In Column 9, Line 19, delete "slack 70. The radio protocol slack" and insert -- stack 70. The radio protocol stack --, therefor.

In Column 9, Line 66, delete "2S" and insert -- 28 --, therefor.

In Column 11, Line 56, delete "link" and insert -- IP link --, therefor.

In Column 12, Line 19, delete "22" and insert -- 72 --, therefor.

In Column 12, Line 24, delete "wherein" and insert -- wherein the --, therefor.

In Column 12, Line 42, delete "9," and insert -- 9. --, therefor.

In Column 13, Lines 21-22, delete "messages," and insert -- messages. --, therefor.

In Column 13, Line 28, delete "of" and insert -- of the --, therefor.

In Column 13, Line 47, delete "the" and insert -- of the --, therefor.

In Column 13, Line 55, delete "TLS/TCP/IP," and insert -- TLS/TCP/IP. --, therefor.

In Column 14, Line 31, delete "spilt," and insert -- split, --, therefor.

In Column 14, Line 51, delete "different" and insert -- different IPv6 --, therefor.

In Column 15, Line 4, delete "PDCP" and insert -- PDCP layer --, therefor.

In Column 15, Line 30, delete "the" and insert -- at the --, therefor.

In Column 15, Line 33, delete "that" and insert -- that are --, therefor.

In the Claims

In Column 16, Line 54, in Claim 5, delete "link" and insert -- IP link --, therefor.

CERTIFICATE OF CORRECTION (continued)
U.S. Pat. No. 10,588,164 B2

In Column 16, Line 62, in Claim 6, delete "modes" and insert -- nodes --, therefor.

In Column 17, Line 11, in Claim 6, delete "the" and insert -- in the --, therefor.

In Column 17, Line 14, in Claim 7, delete "gateway" and insert -- gateway node --, therefor.